BOTTLE RECOGNITION APPARATUS

Filed April 26, 1963 4 Sheets-Sheet 1

INVENTOR.
Paul J. Schneider,
BY
Paul & Paul
ATTORNEYS.

INVENTOR.
Paul J. Schneider,
BY
Paul & Paul
ATTORNEYS.

BOTTLE RECOGNITION APPARATUS

Filed April 26, 1963 4 Sheets-Sheet 3

INVENTOR.
Paul J. Schneider;
BY
Paul & Paul
ATTORNEYS.

BOTTLE RECOGNITION APPARATUS

INVENTOR.
Paul J. Schneider,
BY
Paul & Paul
ATTORNEYS.

United States Patent Office 3,257,897
Patented June 28, 1966

3,257,897

BOTTLE RECOGNITION APPARATUS

Paul J. Schneider, 18 9th Ave., Haddon Heights, N.J.

Filed Apr. 26, 1963, Ser. No. 275,998
8 Claims. (Cl. 88—14)

This invention relates to apparatus for recognizing automatically one or more particular type or types of article, such as a bottle or other container, from among a mixed group of articles of different types. Ordinarily, the recognition apparatus of the present invention will be used in conjunction with automatically operated apparatus to mechanically select and set apart the desired bottles or other articles which have been recognized by the apparatus described and claimed in the present application.

The present invention makes novel use of interrupted or pulsating light beams, light-sensitive devices, optic elements, electro-mechanical devices, and electronic circuits, to generate electrical control or indicating signals. The apparatus is capable of distinguishing one or more desired types of bottles or other articles from among a mixed group whose items differ only in their light transmissive or reflective characteristics, such as color, or optical density, or optical refractive qualities. On the basis of such differences, electrical control signals are developed which indicate the results of this differentiation. The control signals may then be used to sort such items automatically into groups according to predetermined criteria.

In one specific and important application, the apparatus is used to recognize and differentiate between bottles of different color, such as between green (or other color) and white glass bottles. Specifically, the apparatus is used in sorting soft drink bottles.

The invention will be clearly understood from the following detailed description of several forms or embodiments of the apparatus illustrated in the drawing. In the description, it will be convenient to refer to the items recognized as bottles, but it will be understood that the items to be recognized may be any form of container or other article having different light-transmissive or reflective qualities.

Referring now to the drawing.

Figures 1, 6:
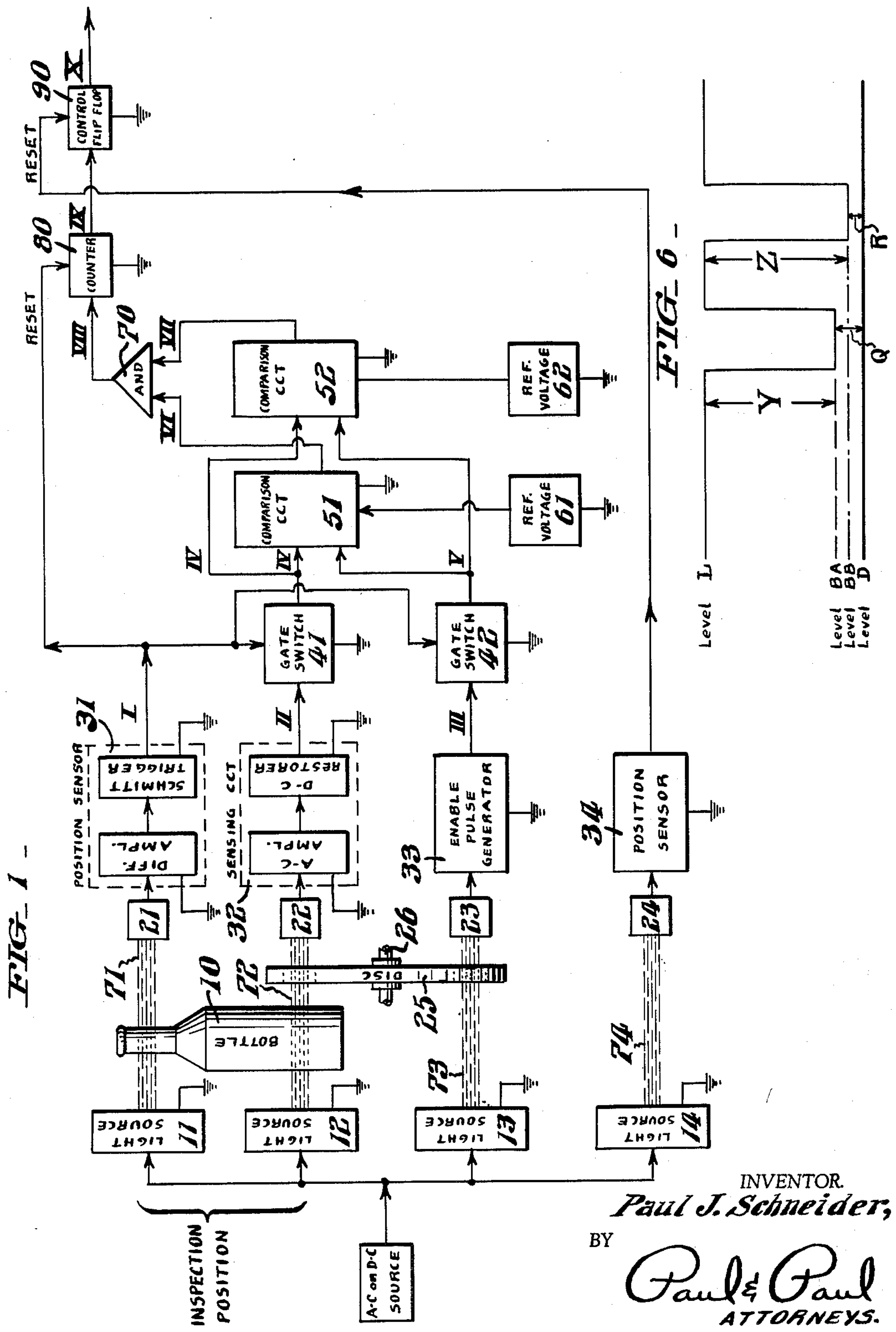
FIG. 1 is a block diagram of one form of the basic inspection and differentiating system which is capable of recognizing one type of bottle from a mixed group of bottles.
FIG. 6 is a diagram used herein to explain the importance of using an interrupted, rather than a continuous, light beam.

In describing the preferred embodiments of the invention illustrated in the drawing, specific terminology has been resorted to for the sake of clarity. However, it is not the intention to be limited to the specific terms so selected, and it is to be understood that each specific term indicates all technical equivalents which operate in a similar manner to accomplish a similar purpose.

Referring now to FIG. 1, incandescent lamps or other suitable light sources 11, 12, 13, and 14 are energized either by an A.-C. or D.-C. electrical source. Ordinarily, an A.-C. source is satisfactory, but in those cases where the developed signal is very small, it will be preferable to use a D.-C. source to avoid the modulation of the light intensity which is present where an A.-C. source is used. However, this is not to be construed as a limitation upon the system, since in many cases the developed signal will be adequately large to allow use of alternating-current energization of the light source.

The light beams 71, 72, 73 and 74 from the light sources 11, 12, 13 and 14, respectively, are directed to normally fall upon the photosensitive cells or elements 21, 22, 23 and 24, respectively. In the system now being described, three of the four cells, namely, cells 21, 22 and 24, are preferably phototransistors and are used to detect the variation of light intensity caused by the presence or absence of an intervening bottle in the respective light paths 71, 72 and 74. The other light beam 73 is not in the path of the bottle as it is transported along. Beam 73 may be either below, or above, the bottle path, or in any other position where it is not interrupted by the bottle as the bottle is moved along. Since beam 73 is not modified by the bottle cell 23 may be merely a photodiode used to detect the presence or absence of light as the light beam is interrupted, as by the chopper disc 25.

In FIG. 1, the light beam chopper is a rotatable slotted metal disc 25 fastened to a rotating shaft 26 driven by a motor (not shown). The disc 25 is driven at some convenient speed, for example, 3350 revolutions per minute. The speed is not critical. The disc 25 is slotted, a four-blade four-slot disc being shown in FIG. 5. A disc having a larger number of blades and slots may, of course, be used in some cases. The disc 25 is placed in the light-beam paths 72 and 73 between the light sources 12, 13 and the photo-elements 22, 23, respectively. Thus, the light beams 72 and 73 directed toward elements 22 and 23 are periodically interrupted. Disc 25 is preferably positioned close to photocells 22 and 23 so as to tend to reduce the amount of ambient light reaching these cells. It may, however, be positioned farther away from the photocells and may even be placed on the other side of the bottle path, between the light sources 12 and 13 and the bottle path. A mechanical chopper, such as disc 25, is preferred because it provides a sharper cut-off, but pulsating sources of light may be employed in some cases to provide the interrupted light beams 72 and 73.

The reason for, and importance of, using an interrupted light beam will now be briefly discussed. Referring now to FIG. 6, L represents the output level of, for example, phototransistor 22 is response to the light in beam 72 while D represents the output level of the phototransistor 22 when the light beam 72 is cut off by the disc 25. BA represents the output from photocell 22 at an instant when the light beam 72 is not being interrupted by the disc 25 but is being intercepted and modified by a bottle A of one type or color of glass, while BB represents the output level of cell 22 when the beam is intercepted and modified by a bottle B of another type or color of glass. It will be seen that, if the light beam 72 is not of the interrupted (or pulsating) type, the sensing system would be required to distinguish between Y and Z, where Y is the difference between levels L and BA, and Z is the difference between L and BB. Note that the difference between Y and Z may be only 5 to 10 percent of Y. But when the light beam 72 is chopped, the dark level D may be used by the sensing system as the reference level, and the system then need only distinguish between Q and R. This difference may be of the order of 100 percent of R.

Returning now to FIG. 1, in response to the chopped or interrupted light falling on photocells 22 and 23, the sensing circuit 32 and the enable pulse generator 33 develop trains of electrical pulses. These pulse trains, which are identified in FIGS. 1 and 2 as pulse trains II and III, respectively, are always present at the output of circuits 32 and 33, so long as the light sources 12 and 13 are energized and the disc 25 is rotating. Whether or not these pulse trains reach the comparator circuits 51 and 52 depends upon the condition of the gate switches 41 and 42, as will be described.

Figures 2, 5:
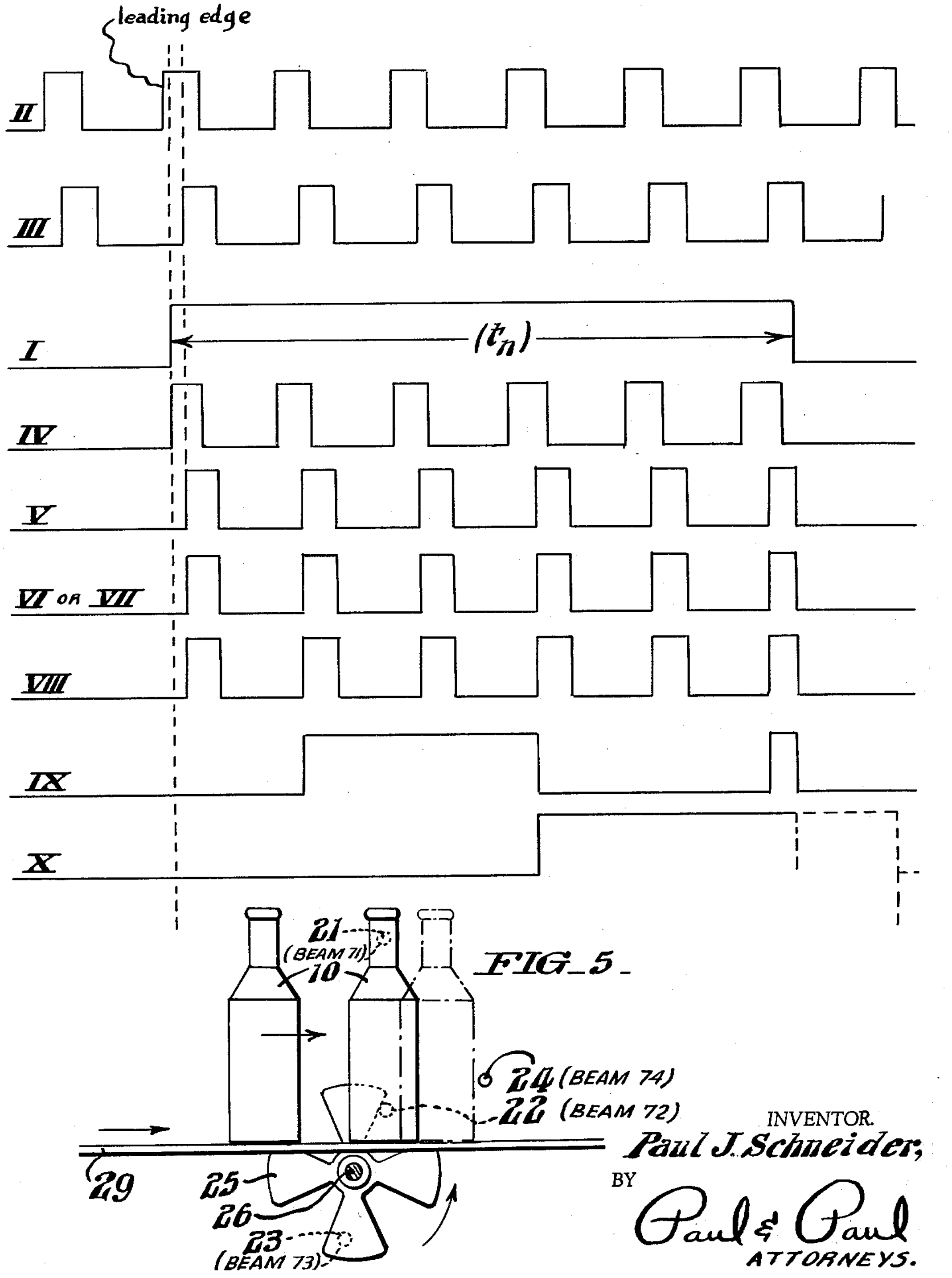
FIG. 2 is a diagrammatic representation of idealized pulse forms used in the apparatus, showing their time relationship.
FIG. 5 is a diagrammatic elevational view showing the positions of the photocells relative to the bottle path.

The time relation of the two pulse trains II and III is shown in FIG. 2 and is determined by the relative physical positions of photo-elements 22 and 23 with respect to the chopper disc 25. As illustrated in FIG. 5, the photo-elements 22 and 23 are so positioned, relative to the blades and slots of disc 25, that the light beams 72 and 73 are not interrupted and restored in exact time coincidence. In FIG. 5, it will be seen that the interrupted light beam to cell 23 is not restored until shortly after the light beam to cell 22 has been restored. As a result, as clearly illustrated in FIG. 2, the leading edge of a pulse in pulse train III occurs after the corresponding pulse in train II has reached full amplitude. Once the positions of elements 22 and 23 are set relative to the disc 25, the two pulse trains II and III will remain locked in the same time relation, since both are generated by the same spinning disc 25. This arrangement insures that the amplitude of each pulse in pulse train II has reached a steady state value before it is sampled by succeeding circuitry, as will be described.

Sensing circuit 32 may preferably comprise an A.-C. coupled amplifier followed by a D.-C. restorer circuit which employs the dark level D of FIG. 6 as a reference. These may preferably be transistor circuits of known conventional type. The A.-C. coupling is necessary to prevent changes in ambient light and temperature at the photo-element 22 from causing large D.-C. output changes. The D.-C. restorer circuit is then used at the output to re-establish the dark level reference. This arrangement, of A.-C. coupling and D.-C. restoration, permits the sensing circuit 32 to respond rapidly to the relatively large step changes which occur whenever a bottle under inspection intercepts the light beam 72 falling on element 22 without waiting for the relatively long time constants inherent in A.-C. coupling circuits. D.-C. restoration also permits the comparator circuits, items 51 and 52, later to be described, to operate on the full pulse amplitude referenced to ground. Without D.-C. restoration, only a fraction of the pulse amplitude (depending on the symmetry of the pulse train) would be available for the comparator circuits.

The enable pulse generator 33 is a transistor switch of known type which is triggered by the signal developed by the action of the interrupted light beam 73 falling upon photodiode element 23.

The position sensor 31 consists of an amplifier, preferably a transistorized difference amplifier, driving a Schmitt trigger circuit, both of which are known types of circuit. The difference amplifier is driven by the electrical output of the phototransistor element 21, developed in response to light beam 71 as modified by an intercepting bottle. A difference amplifier is preferably used so as to compensate for any drift in the signal from the phototransistor 21 due to changes in the ambient temperature. The Schmitt trigger circuit is used to provide a high input impedance. It also gives an output signal having a fast rise time.

The output signal of the Schmitt trigger of position sensor 31 is a pulse developed when the neck of a bottle intercepts and modifies light beam 71. This pulse is shown in FIG. 2 as pulse I. Pulse I functions as a gate pulse. It is not synchronized with respect to pulse trains II and III. The pulse I exists so long as the light beam 71 is intercepted by the neck of the bottle. The travel rate of the bottle through the beams 71 and 72 is so chosen relative to the interruption rate of the chopped beam 72 that pulse I has a duration ($t_n$) sufficiently long to span at least several, preferably at least ten, consecutive pulses of each of pulse trains II and III. It will be understood that the pulses of pulse train III are of substantially constant amplitude, since the beam 73 is not modulated by the bottle; it is merely an interrupted beam.

Gate switches 41 and 42 are identical single transistor circuits. When the gate pulse I is not present, switch 41 becomes a short circuit across the output of sensing circuit 32, and switch 42 becomes a short circuit across the output of the enable pulse generator 33. Under this condition, no pulses occur at the output of either of the switches 41, 42. Whenever the gate pulse of pulse train I is present, each of the switches becomes a very high impedance shunt and pulse trains II and III pass through the gate switches with very little attenuation. The outputs of the gate switches 41 and 42 are identified in FIGS. 1 and 2 as pulse trains IV and V, respectively. It will be seen from FIG. 2 that trains IV and V are in timed relation with pulse trains II and III, respectively, from which they are derived. Each of the pulse trains IV and V are applied to each of the comparators 51 and 52.

Comparators 51 and 52 are known types of circuits and are similar to each other. Each is supplied with a regulated reference voltage of different value. Each comparator may, for example, comprise a transistor flip flop whose condition, when the gate switch is closed, is determined by a second pair of transistors to one of which the reference voltage is applied and to the other of which the input signals are applied. The characteristics of the comparison circuits 51, 52 are, therefore, such that the amplitude of the pulses in pulse train IV are compared against the regulated, but adjustable, reference voltages 61 and 62, respectively. In the present example, it will be assumed that amplitude of reference voltage 61 is always less than that of reference voltage 62. Whenever the amplitude of reference voltage 61 is exceeded by the amplitude of the pulses in pulse train IV from gate switch 41, the comparison circuit 51 will produce a train of pulses on one of its output leads, identified as pulse train VI in FIG. 2. The pulses in train VI are in synchronism with the pulses in pulse train V from the enable generator gate switch 42.

As long as the pulses in pulse train IV passing through switch 41 do not exceed in magnitude the reference voltage 62, comparison circuit 52 will produce a train of pulses, identified as pulse train VII. Like the pulses in train VI, the pulses in train VII are in synchronism with the pulses in pulse train V from the enable generator gate switch 42. In FIG. 2, the two pulse trains VI and VII are shown in a single wave form.

Pulse trains VI and VII are applied to the inputs of a known form of transistorized logic "And" gate 70. Gate 70 produces an output, identified as pulse train VIII, only during that time interval when signals are present on both of its inputs, that is, pulse train VIII will occur only if pulse trains VI and VII are both present.

The process of comparing a pulse train derived from the output signal of the photosensitive element 22 against two reference voltages 61 and 62 of different magnitude and performing logic gating based upon the results of these comparisons is considered to be one of the unique and important features of the apparatus of the present invention. This process enables the apparatus to distinguish between classes of objects which cause a response, the amplitude of which may be termed ($y$), from element 22, and which fall into the following three classes:

Class 1: ($y$) is less than reference voltage 61, and is therefore less than either of the reference voltages;

Class 2: ($y$) is greater than reference voltage 61 but less than reference voltage 62;

Class 3: ($y$) is greater than reference voltage 62, and is therefore greater than either reference voltage.

The circuit of FIG. 1, now being described, will recognize only those pulses whose amplitude falls in class 2.

Counter 80 is a module 4 counter consisting of two triggerable transistor flip-flop circuits of known type. Counter 80 is reset by the trailing edge of the gate pulse I, and is triggered, or stepped, by the pulses of pulse train VIII from the "And" gate. The output of counter 80 will be switched on by every fourth pulse of pulse train VIII. The output of counter 80 is shown in FIG. 2 as pulse train IX. The number of slots in chopper disc 25 and its rotating speed are so chosen, relative to the transport speed of the bottles through light beam 72, that at least ten pulses in train II are developed by each bottle as it passes through the beam 72. The purpose of counting several, preferably at least four, pulses before triggering the final control flip-flop 90 is to eliminate spurious pulses which might be generated by a dirty, damaged, or faulty bottle, and which would develop an erroneous recognition signal.

Control flip-flop 90 is similar to the flip flops in counter 80 but is reset independently by a signal from position sensor 34, whose photocell 24, as shown in FIG. 5, is located at a position displaced a few inches in the direction of travel of the bottle after it leaves the inspection position. This arrangement allows time for an electromechanical sorting gate (not per se part of the apparatus of the present invention) to be activated by the level change X at the output of control flip-flop 90 during the time period that the next bottle is moving into the inspection position.

Position sensor 34 may be substantially identical to position sensor 31 described above. However, it could be replaced with a simple mechanical switch physically actuated by the bottle as it moves away from the inspection position.

For the purpose of discussing the operation of the apparatus described above, assume that it is desired to select a particular type of 12-ounce beverage bottle from a mixed batch of 12-ounce beverage bottles. It is previously determined by test that such a bottle will transmit through it the type of light beam which is emanated from the light sources 11 and 12 to cause a certain range of pulse amplitudes to be delivered from sensing circuit 32 in response to actuation of photosensitive element 22. The reference voltages 61 and 62 are set so that the amplitude range of the pulses from circuit 32 through switch 41 caused by this particular type of bottle is greater than reference voltage 61 but less than reference voltage 62.

When no bottle is at the inspection position, represented in FIG. 1 by the bottle 10, there is no gate pulse I on the output lead of the position sensor 31, and the gate switches 41 and 42 are low impedance shunts or virtual shorts across the outputs of circuits 32 and 33, thereby blocking any input signal to comparator circuits 51 and 52.

As the botles of the mixed group of bottles are transported one by one, as by a conveyor belt (not shown), to the inspection station, the neck of the botle 10 will intercept and modify the magnitude of the light beam falling on phototransistor 21. The difference amplifier of position sensor 31 will product an output, the Schmitt trigger circuit will be triggered, and a gate pulse I will be delivered to the gate switches 41 and 42. Switches 41 and 42 will be actuated and will switch to a condition in which each presents a very high impedance shunt across the output of circuits 32 and 33, respectively, thus allowing the outputs of these circuits to pass to the comparison circuits 51 and 52 with little or no attenuation. Stated another way, gate switches 41 and 42 block the outputs of circuits 32 and 33 from passing through to the comparator circuits 51 and 52 except when, and so long as, the beam of light 71 is being intercepted and modified, as by the neck of the bottle 10. At this time, the beam of light 72 from light source 12 is directed laterally through the longitudinal center part of the same bottle 10 and is falling in chopped form on phototransistor 22.

The arrangement just described, involving a gate circuit which is closed except when the longitudinal center part of the bottle is in the light beam 72, guarantees that the amplitude of pulse train II from sensing circuit 32 is a valid representation of the responses for the type of bottle being inspected. It does this by blocking from the comparators 51 and 52 the ambiguous signals which would otherwise occur as the peripheral longitudinal edge of the bottle passed into and out of the light beam 72. This arrangement is deemed to be a novel and important feature of the apparatus of the present invention and contributes in an important way to its ability to differentiate between small differences in response.

The optical qualities of the bottle being inspected, such as its density and color, or the way in which it causes the light beam 72 from light source 12 to be refracted, will cause a certain range of amplitudes to exist on pulse train II. Whenever the amplitudes of these pulses lie between the level of reference voltage 61 and reference voltage 62, output signals will be delivered from both of the comparators 51 and 52, and "And" gate 70 will deliver output pulses to counter 80. As soon as, for example, four pulses have been received by the counter 80, the control flip-flop 90 will be set and the level change X, depicted in FIG. 2, will occur on the output lead of the flip-flop, signifying that the particular bottle 10 under inspection belongs to the desired class.

When the neck of the bottle 10 has moved out of the light beam 71 falling on photo-element 21, the gate pulse I will terminate and gate switches 41 and 42 will switch to their low impedance condition in which they present virtual short circuits across the outputs of sensing circuit 32 and enable pulse generator 33. Thus, pulse trains IV, V will cease, and there will be no pulse trains VI, VII or VIII. Counter 80 will be reset by the signal level from the Schmitt trigger of the position sensor 31.

FIG. 5 is a diagrammatic representation of a bottle 10 being transported, from left to right as viewed in FIG. 5, on a conveyor 29 driven by a well known means not shown. As depicted in FIG. 5, light beam 73 is out of the bottle path, but beam 74 is in a position to be intercepted by the bottle 10 as soon as it is moved away from the inspection position. Thus, as the bottle 10 moves along, it intercepts and modifies the light beam 74 from light source 14 which is directed to photo-element 24. When this occurs, position sensor 34, which may be similar in make-up to position sensor 31, generates a pulse signal which is applied to the control flip-flop 90 to cause it to be reset. However, as previously noted, this reset function could be performed in other ways. For example, a switch could be activated physically by the bottle, rather than interrupting a light beam 74 as shown.

Figure 3:
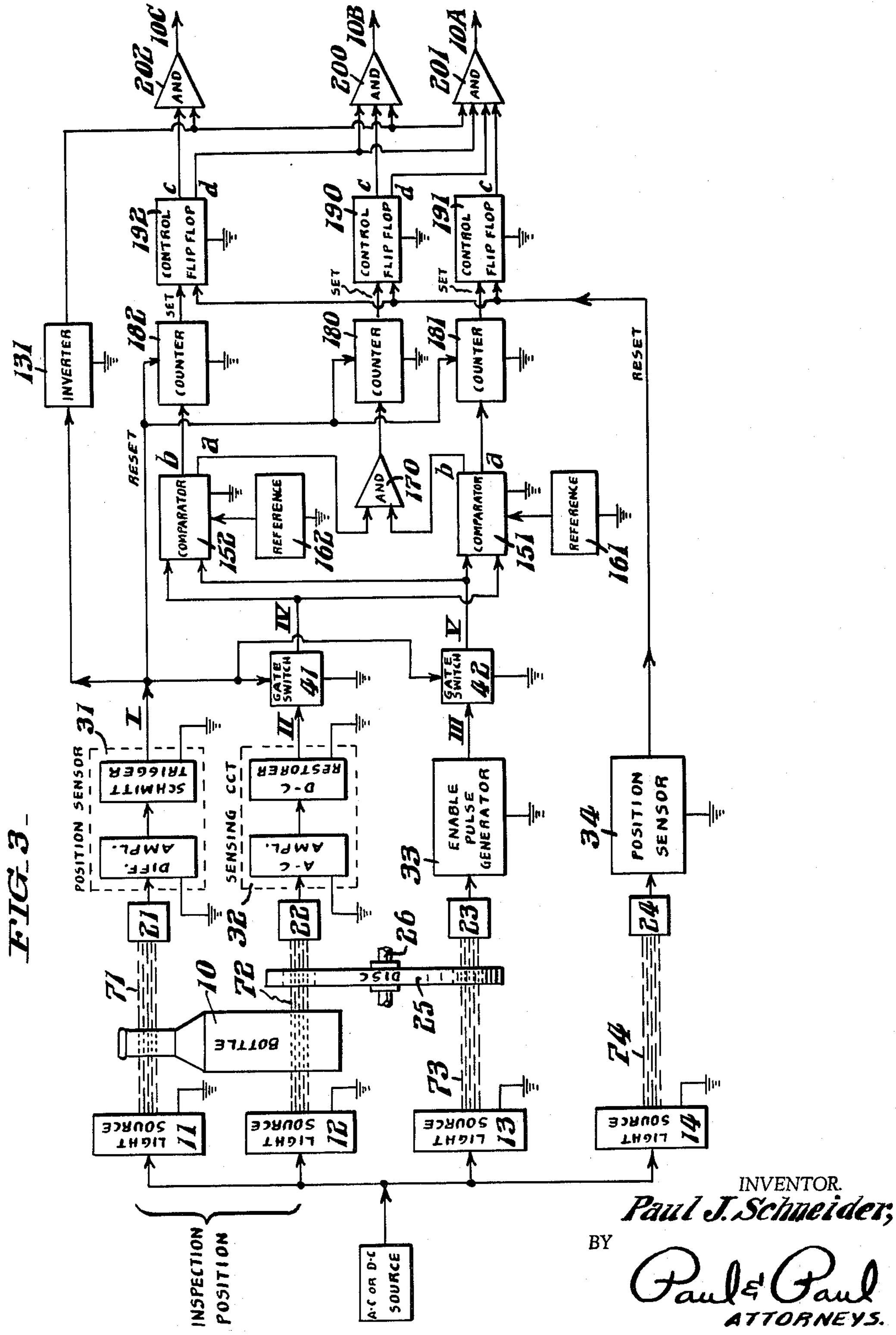
FIG. 3 illustrates an alternate and preferred form of apparatus capable of recognizing and distinguishing three desired types of bottles from a mixed group.

As previously indicated, the apparatus of FIG. 1 is capable of recognizing one type of bottle out of a mixed group. In FIG. 3, to which reference is now made, the apparatus is capable of recognizing three different types of bottles from a mixed group, and of distinguishing each of the three types from the others.

The apparatus of FIG. 3 is similar in a number of respects to that of FIG. 1, and in the drawing like components are identified by like reference numerals. As viewed in the drawing, the left half portion of the apparatus of FIG. 3 is substantially identical to the left half portion of FIG. 1; the difference between the two systems resides in the right half portion of the circuitry, beyond the gate switches 41 and 42.

In FIG. 3, unlike FIG. 1 where an output is taken from only one of two output terminals of each comparator, the comparison circuits 151 and 152 are each arranged to deliver an output on one or the other of its two output terminals in response to input pulse signals aplied through the gate switches 41 and 42. In FIG. 3, when the amplitude of the pulses IV applied through the gate switch 41 to comparator 151 is less than the reference voltage 161, an output occurs on the lower lead "a" of the comparator; when the applied pulses IV are greater than the reference voltage 161, the output occurs on lead "b." The same applies to the outputs from comparator 152 with respect to the pulse signals IV applied from switch 41 to this comparator. When the amplitude of the applied pulse is less than the reference voltage 162, an output occurs on lead "a" of comparator 152; when the applied pulses are greater than reference 162, the output occurs on lead "b." Reference voltage 161 is assumed to be smaller than reference voltage 162. Thus, if the applied pulses from gate switch 41 are greater than reference 161 but less than reference 162, outputs will occur on lead "b" of comparator 151 and on lead "a" of comparator 152. In such case, "And" gate 170 passes the signal to the counter 180, which may preferably be a modulo 4 counter.

In FIG. 3, when the pulses IV applied to comparators 151 and 152 from switch 41 are less in magnitude than the reference voltage 161, an output is developed on leads "a" of both comparators and the "And" gate 170 remains closed. In this case, however, a train of pulses is applied from comparator 151 to the modulo 4 counter 181, and after four pulses, an output is delivered to the control flip-flop 191 to set the flip flop.

When the amplitude of the pulses IV delivered from switch 41 are greater than the reference voltage 162, output signals appear on leads "b" of both comparators, and "And" gate 170 remains closed. A train of pulses is, however, delivered from comparator 152 to the modulo 4 counter 182, and after four such pulses, the counter 182 delivers an output to the control flip-flop 192 to set the flip flop.

When any one of the control flip-flops 190, 191, and 192 is in the reset state, the voltage level on output lead "c" of that flip flop is of such value as to apply an inhibit signal to the respective "And" gate 200, 201, and 202 to which the "c" lead is connected, while at the same time the voltage level on output lead "d" of the reset flip flop is of a value to apply a prime signal to the "And" gate or gates to which the "d" lead is connected.

When no bottle is in the inspection position, the light beam 71 has an intensity such that the output signal from phototransistor 21 puts position sensor 31 in a state in which its output level places each of the gate switches 41 and 42 in a low impedance state. In this state, each gate switch 41 and 42 functions as a short to ground across the output circuits of sensing circuit 32 and enable pulse generator 33, respectively. Position sensor 31, in the state just referred to, applies a reset signal to each of the counters 180, 181, and 182, and also to the inverter 131. This places the inverter 131 in a state in which it applies a prime signal to each of the "And" gates 200, 201, and 202. However, at this time, each of the three gates 200, 201, and 202 is inhibited by the presence of an inhibit signal on each of the three leads "c" from the three control flip-flops 190, 191 and 192, each of which is in a reset state. This assumes that a preceding inspected bottle has passed through the beam 74, causing a reset signal to be applied to each of the three control flip-flop circuits 190, 191 and 192.

Assume now that a bottle, such as bottle 10, arrives at the inspection station. When the neck of the bottle intercepts and modifies the light beam 71, position sensor 31 is triggered and a gate pulse I is developed which switches gate switches 41 and 42 to their high impedance states, allowing the trains of output pulses IV and V from sensing circuit 32 and enable pulse generator 33 to pass through to the comparators 151 and 152. The gate pulse I from position sensor 31 also resets the counters 180, 181, and 182. It also resets the inverter 131, causing the inverter to apply an inhibit level signal to the "And" gates 200, 201, and 202.

It should be noted that during the time that a bottle is being inspected, each of the output gates 200, 201, and 202 is inhibited. This prevents a premature and possibly incorrect indicating signal from being delivered from the output gates until such time as a sufficient number of light pulses in beam 72 have passed through the main body of the bottle to form a correct decision as to the type of bottle being inspected.

It has been stated above that the apparatus of FIG. 3 is capable of recognizing three types of bottles and of distinguishing therebetween. The three types of bottles may be referred to as 10A, 10B, and 10C. Recognition signals for bottle 10A are delivered from "And" gate 201; recognition signals for bottle 10B are delivered from "And" gate 200; and recognition signals for bottle 10C are delivered from "And" gate 202.

Bottle 10A is a type which, when it intercepts the light beam 72, modifies the beam to cause the circuit 32 to produce and deliver pulses whose amplitude, in an ideal case, is less than the smaller of the reference voltages, reference 161. In practice, some of the pulses may be greater than the reference 161, but so long as the number of such pulses is less than four (assuming a modulo 4 counter is used) no erroneous output signal will be developed.

Bottle 10B is of a type which modifies the light beam 72 to cause circuit 32 to produce and deliver pulses whose amplitude, in an ideal case, is less than the larger reference voltage 162 but greater than the smaller reference voltage 161. In practice, some of the pulses may be greater than reference 162, but so long as the number of such pulses (where a modulo 4 counter is used) is less than four, no erroneous output signal will be developed. However, for a reason later to be explained, the number of pulses which are smaller in amplitude than the reference 161 may be greater than four without producing an erroneous output signal. This is due to a primary lock-out feature which will be explained.

Bottle 10C is of a type which modifies the light beam 72 to cause circuit 32 to produce and deliver pulses whose amplitude, in an ideal case, is greater than the larger reference voltage 162. However, due to the primary lock-out feature just referred to, the number of pulses less than reference 162 may be greater than four without producing an erroneous output signal.

The operation of the system of FIG. 3 will now be described with reference first to a bottle type 10A.

In operation, when a bottle of type 10A reaches the inspection position, trains of output pulses greater in number than four are produced on leads "a" of each of the comparators 151 and 152. "And" gate 170 blocks the pulse train from comparator 152, but the train from comparator 151 is applied to modulo 4 counter 181, and after four pulses are received, a pulse is applied to set the control flip-flop 191. The prime level now on lead "c" of the set flip flop 191 now primes gate 201, while the inhibit levels on leads "c" of the reset flip flop 190 and 192 inhibits the gates 200 and 202. When the neck of bottle 10A leaves the beam 71 at the inspection position, the position sensor 31 is triggered and inverter 131 switches its state. This applies a prime level signal to each of the output "And" gates and an output signal is delivered from gate 201. The other two gates 200 and 202 are inhibited by the signal levels on leads "c" from flip flops 190 and 192 and no output signal is delivered from these two gates. In this manner, the apparatus of FIG. 3 recognizes bottle 10A and delivers a recognition signal on the output lead from gate 201.

When the bottle 10A leaves the inspection station, it intercepts and modifies the light beam 74. Position sensor 34 is triggered and a reset signal is applied to each of the control flip-flops 190, 191, and 192 to reset the flip flops. As a result, an inhibit level signal is applied to each of the "And" gates 200, 201, and 202 by way of the three leads "*c*." The apparatus is now ready for the next bottle.

Assume that a bottle of type 10B is now presented at the inspection position. When the neck of the bottle 10B intercepts light beam 71, a gate pulse I is produced which switches gate switches 41 and 42 to their high impedance conditions in which they pass signals to the comparators. The pulse I also resets each of the three counters 180, 181, and 182, and inverter 131 is reset to a state in which it applies an inhibit signal to each of the "And" gates 200, 201, and 202. Circuit 32 delivers a train of pulses more than four of which have an amplitude greater than reference voltage 161 but less than reference voltage 162. Thus, output signals appear on lead "*b*" of comparator 151 and on lead "*a*" of comparator 152. These signals open the "And" gate 170 and a train of pulses passes to modulo 4 counter 180. After four pulses have been applied, the control flip-flop 190 is set. In the set condition, flip flop 190 has a prime level on its lead "*c*" and an inhibit level on its lead "*d*." Gate 200 thus receives a prime signal from 190 while gate 201 receives an inhibit signal. At the same time, gate 202 is receiving an inhibit signal from lead "*c*" of flip flop 192 which is in the reset state. Gate 201 is also receiving an additional inhibit signal from lead "*c*" of flip flop 191, which, for the present discussion, is assumed to be in the reset state. Thus, when the neck of the bottle 10B leaves the beam 71, and the inverter 131 is switched to a state which delivers a prime signal to each of the three gates 200, 201, and 202, only gate 200 has no other inhibit signal on its input circuits, and only gate 200 delivers an output signal. This signal indicates that a bottle of type 10B has been recognized.

In the above discussion, it was assumed that only flip flop 190 was set. Actually, the system shown in FIG. 3 contains what may be called a primary lock-out feature which has been previously referred to and which will now now be described. While bottle type 10B has been defined as a bottle which, in an ideal case, will produce pulses of an amplitude larger than the smaller reference 161 but smaller than the larger reference 162, bottle 10B may be a bottle having a cut-glass or other design which produces pulses whose amplitudes are not uniform, some (at least four) being larger than the smaller reference 161 and others (at least four) being smaller than 161, but all (three or less) being less than reference 162. It will be understood that the parenthetical statements in the preceding sentence apply where modulo 4 counters are used. Other modulo counters may, of course, be employed. However, it is not essential to the basic concept of the present invention that counters be employed at all, but, in many cases, the employment of counters improves substantially the accuracy of the system.

Returning now to the description of the primary lock-out feature as applied to a bottle type 10B, assume that the bottle 10B produces at least four pulses which are less than the reference 161 as well as at least four pulses which are greater than 161 but smaller than 162. In that event, an output signal will appear on lead "*a*" of comparator 151 and counter 181 will pass a pulse to set flip flop 191. Outputs will also appear on lead "*b*" of comparator 151 and on lead "*a*" of comparator 152. These signals will pass through "And" gate 170 to counter 180, and will set flip flop 190. In other words, under the conditions now being assumed, bottle 10B will cause both flip flop 190 and flip flop 191 to set; only flip flop 192 will remain in reset state. However, with the three flip flops in these states, when the state of inverter 131 is changed by the gate pulse from position sensor 31, an output signal will appear only on lead 10B. This is because gate 201 is inhibited by the inhibit level signal on lead "*d*" from the set flip flop 190.

When the bottle 10B leaves the inspection station, it intercepts light beam 74 and a reset signal is applied to the three control flip-flops 190, 191, and 192. These circuits then apply an inhibit level signal on their respective leads "*c*" to the gates 200, 201, and 202 to inhibit the gates. The apparatus is now ready for the next bottle.

Assume that the next bottle is type 10C. It will be assumed first that this type, when it intercepts light beam 72, produces pulses whose amplitude exceeds that of the larger of the two reference values, namely, reference 162, and that not more than three of the pulses are of lesser amplitude than 162. Output signals appear on leads "*b*" of comparators 151 and 152. The signals from lead "*b*" of comparator 151 are blocked by the "And" gate 170, but the signals on lead "*b*" of comparator 152 are applied to modulo 4 counter 182 and, after three pulses have been applied, the fourth pulse passes through and sets the control flip-flop 192. The signal level on lead "*c*" of control flip-flop 192 is then changed from an inhibit level to a prime level and gate 202 is primed. At the other two flip flops 190 and 191, which are assumed for this discussion to be in reset states, leads "*c*" are at inhibit level while leads "*d*" are at prime level. Thus, only "And" gate 202 is in a condition to pass a signal as soon as the inhibit signal from inverter 131 is changed to a prime signal. This occurs as soon as the neck of the bottle 10C passes out of the beam 71. Thus, gate 202 delivers a signal indicating that a bottle of type 10C has been identified. The other two gates remain inhibited by the inhibit levels on the "*c*" leads from flip flops 190 and 191.

While, as just described, the system of FIG. 3 is capable of recognizing a bottle of type 10C assumed to produce pulses whose amplitudes exceed the larger reference 162 (except possibly for three or fewer pulses), the system of FIG. 3 is also capable of recognizing a bottle type 10C whose surface may be etched or cut into such a design as to produce four or more pulses in each of the three categories, i.e., (1) greater than reference 162, (2) less than reference 162 but greater than reference 161, and (3) less than reference 161. In such case, each of the three flip-flops 190, 191, and 192 will be set, but an output signal will appear only on lead 10C since gates 200 and 201 will be inhibited by the inhibit level signals appearing on lead "*d*" of flip-flop 192.

To summarize, due to the primary lock-out feature of the system of FIG. 3, an output will be obtained on only one output lead, i.e., the one associated with the higher or highest amplitude of four or more pulse signals, even though the particular bottle produces more than three pulses having an amplitude in a lower category. This technique permits the system to recognize, for example, the 12-ounce Pepsi-Cola bottle which, due to its swirl design, produces pulses in all three categories.

Attention is also called to the fact that the apparatus of the present invention also employs what might be termed an output lock-out feature, controlled by the gate pulse from position sensor 31, whereby no output is delivered from any one of the three output "And" gates 200, 201, and 202 until after the neck of the bottle has left beam 71. This gives the system a full opportunity to inspect the bottle presented at the inspection station. Also, by employing modulo 4 counters, up to and including three erroneous signals may be developed without causing an error in decision, since no decision is made as to the type of bottle presented for inspection until after at least four signals are developed. This is the function of the modulo 4 counters. And, by reason of the output lock-out feature in combination with the primary lock-out feature, a preliminary decision may be changed before an output signal is delivered, as, for example, where four smaller pulses are followed by four larger pulses.

Figure 4:
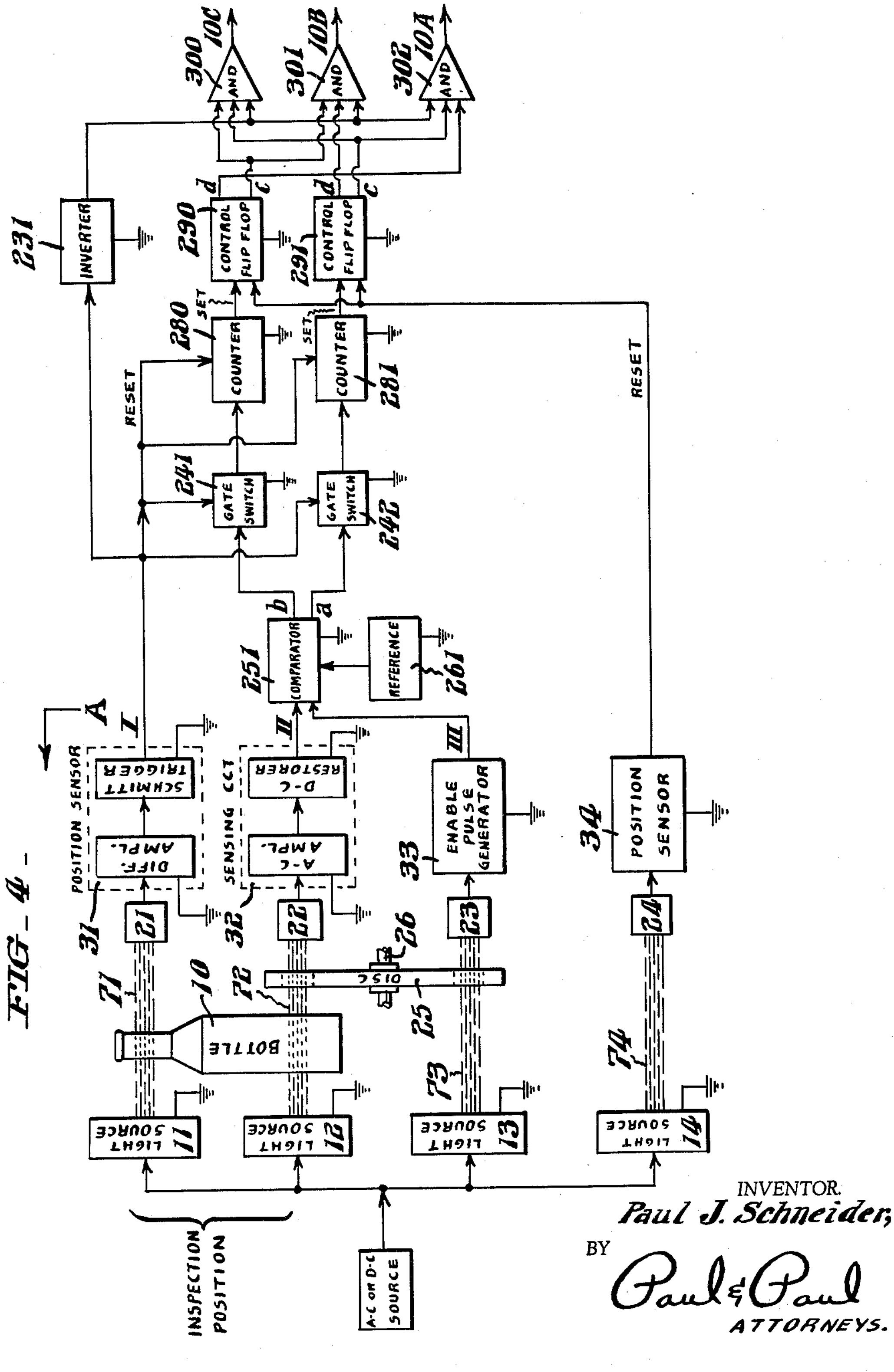
FIG. 4 illustrates yet another alternate form of recognition apparatus.

Referring now to FIG. 4, an alternate system is there shown which is generally similar to the system of FIG. 3 but employs different logic. Also, the specific responses of the bottle types differ. That portion of the system of FIG. 4 which lies to the left of the arrow A is identical to that of the systems of FIGS. 1 and 3; that portion which lies to the right is somewhat different.

In the system of FIG. 4, only one comparator is employed and only one reference voltage. The gate switches 241 and 242 are located to the right of the comparator 251, rather than to the left, as viewed in the drawing.

In the system of FIG. 4, it will be assumed that a bottle type 10A generates sensing circuit output pulses (pulse train II) whose amplitude is always less than the reference voltage 261.

Bottle type 10B is assumed to generate sensing circuit output pulses (train II) whose amplitude is always greater than the reference voltage 261.

Bottle type 10C is assumed to generate sensing circuit output pulses some of which are greater than and others of which are less than the reference voltage 261.

In FIG. 4, when the control flip-flop 290 and 291 are in a reset state, an inhibit level signal appears on the leads "*c*" and a prime level signal on the leads "*d*" of the flip-flops. It will be seen that when both of the flip-flops 290 and 291 are in the reset condition, all three output gates 300, 301 and 302 are inhibited and no output can occur.

In FIG. 4, as in FIG. 3, when the neck of a bottle intercepts light beam 71, the Schmitt trigger of position sensor 31 produces a gate pulse I which is applied through inverter 231 to inhibit each of the output gates 300, 301 and 302. Thus, no output signal can be delivered so long as the bottle is being inspected.

Asssume that a bottle type 10A is presented for inspection. This produces a pulse train II having an amplitude less than the reference 261 and an output occurs on lead "*a*" of comparator 251. After four pulses, control flip-flop 291 is switched to the set state, and the center input leads of gates 300 and 302 are primed. The top input lead of gate 300 is an inhibit from lead "*c*" of flip-flop 290, but the top input of gate 302 is a prime from lead "*d*" of 290. Thus, when the neck of the bottle 10A leaves the beam 71 and the gate pulse I from position sensor 31 is removed, the inverter 231 applies a prime signal to all three output gates, and when this occurs, gate 302 delivers an output indicative that a bottle type 10A has been recognized. The other two gates remain inhibited by the inhibit signal from lead "*c*" of control flip-flop 290.

Consider now a bottle of type 10B to be presented for inspection. This bottle produces a pulse train II which is of greater amplitude than the reference 261 and the comparator 251 delivers an output on lead "*b*." After four pulses, control flip-flops 290 is set and prime signals are applied to output gates 300 and 301. The center input of gate 300 is inhibited by the inhibit signal from the "*c*" lead of flip-flop 291, but the center input of gate 301 is primed by the prime level signal on lead "*d*" of flip-flop 291. Thus, when the bottle 10B leaves the light beam 71, and the inverter 231 applies a prime signal to the gates, all three inputs of gate 301 are at prime level and an output is delivered therefrom indicating that a bottle type 10B has been identified. The other two gates 300 and 302 remain inhibited by the inhibit level signal on the "*c*" lead of flip-flop 291.

Assume now that a bottle type 10C is presented for inspection. This type of bottle produces some signal pulses larger than, and others smaller than, reference voltage 261. Output pulses, greater than four in number, appear on each of the output leads "*a*" and "*b*" of comparator 251, and both of the control flip-flops 290 and 291 become set. Gates 301 and 302 receive inhibit level signals from the leads "*d*" of the two flip-flops. Gate 300 receives a prime signal on each of its two upper input leads, one from gate 290 and the other from gate 291. Thus, when the bottle 10C leaves the beam 71, gate 300 produces an output pulse. The other two gates remain inhibited by the inhibit level signals on the "*d*" leads of the flip flops 290 and 291.

While the apparatus of the present invention has been shown and described in several forms, still other modifications are feasible without departing from the important basic concepts which characterize the present invention. The important features of the new system are:

(1) The use of a position sensor to disable the system except when the longitudinal center portion of the bottle is in the light beam of the main sensing circuit. This technique avoids the erroneous signals which result when the main sensing beam is partially reflected from the peripheral edges of the bottle. While the position sensor beam has been shown as passing through the neck of the bottle, a reflected beam of light could be used for the position sensor.

(2) The use of an enable pulse to insure that the main sensing signal has attained full amplitude before being applied to the comparator. The function of the enable pulse could be obtained in other ways than shown, as by a delay circuit.

(3) The derivation of a plurality of pulses for each bottle and the employment of a modulo 4 (or other) counter. This technique avoids the erroneous signals which are produced by smudges and other small light obstructions on or in the bottle.

(4) The use of D.-C. restoration permits short time-constant circuits to be used. This allows the bottles to be processed at greater speed than would otherwise be possible if relatively long time-constant circuits were employed.

(5) The use of a chopped or interrupted light beam as the main sensing beam. This allows comparison with the dark level, rather than the white level, and improves the precision of the comparison.

(6) The use of the primary lock-out feature which enables the apparatus to recognize bottles (or other articles) having etched or cut or other designs which cause generation of pulse signals of various amplitudes.

(7) The use of the output lock-out feature which enables the apparatus to postpone announcement of its decision until after all signals have been derived, thereby allowing for a change in decision as the later signals are received.

While the preferred embodiments of this invention have been described in some detail, it will be obvious to one skilled in the art that various modifications may be made without departing from the invention as hereinafter claimed.

Having described my invention, I claim:

1. Apparatus for recognizing one or more types of bottles from among a plurality of different types of bottles, said apparatus comprising: an inspection position having means for generating a first light beam, chopper means for chopping said beam at a delatively high rate, and a first photo-sensitive device positioned to receive said chopped light beam for generating electrical pulses in response thereto; means for moving said bottles so that the body portions of said bottles pass successively through said chopped light beam to modulate said beam, said bottles moving at a speed such as to permit a plurality of modulated light pulses to be received by said photo-sensitive device for each bottle; a sensing circuit comprising an A.-C. amplifier and a D.-C. restorer; means for applying the output of said photo-sensitive device to said sensing circuit for developing modulated output signals which vary between a dark level base reference corresponding to the light received when said beam is cut off by said chopper means and a value which varies in amplitude, according to the magnitude of the light pulses received by said photo-sensitive device when said light passes through said chopper means; a delay system for assuring that said modulated output signals reach full amplitude before being sampled, said delay system comprising a second light beam out of the path of said bottles, means utilizing said chopper means for chopping said second beam in fixed time delay relationship to the chopping of said first beam, a second photo-sensitive device for receiving said chopped second light beam, and means for generating electrical sampling pulses of substantially fixed amplitude in response thereto; comparator means having reference signals applied thereto; means for applying to said comparator means said modulated output signals of said sensing circuit and also said electrical sampling pulses of fixed amplitude for comparing the combined amplitudes of the applied modulated signals and sampling pulses with said reference signals, and for developing an output signal indicative of said comparison; counter means; means for applying the output of said comparator means to said counter means for producing an output only after a selected number of output signals have been received from said comparator means; gate switch means preceding said counter means for normally blocking the application of signals to said counter means; position sensing means for sensing when the center portion of each bottle is in the first light beam, said position sensing means comprising means at said inspection position for generating a third light beam through which the neck portions of the bottles pass, a third photo-sensitive device positioned to receive said third beam, and means for developing an output signal from said third photo-sensitive device for so long as the neck portion of said bottle is in the third beam; and means for applying the output signal of said position sensing means to said gate switch means for unblocking said gate switch means for so long as the neck portion of said bottle is positioned in the third beam; bistable means for developing a bottle recognition signal according to the state of said bistable means; and means for applying the output of said counter means to said bistable means.

2. Apparatus as claimed in claim 1 characterized in that said gate switch means precedes said comparator means.

3. Apparatus as claimed in claim 1 characterized in that said gate switch means follows said comparator means.

4. Apparatus as claimed in claim 1 characterized by the provision of means for applying the output of said position sensing means to said counter means to reset said counter in response to the change in output signal from said position sensing means when the neck portion of said bottle leaves said third beam.

5. Apparatus as claimed in claim 4 characterized in the provision of means for sensing that the bottle has left said inspection position and for developing a signal in response thereto, and means for applying said last-named signal to said bistable means to reset the same.

6. Apparatus as claimed in claim 5 further characterized in that said comparator means includes first and second comparators having first and second reference voltages applied respectively thereto, said second reference voltage being greater than said first, said first comparator having an output circuit for developing an output signal when the combined amplitude of the signal and sampling pulses applied thereto is greater than said first reference voltage, said second comparator having an output circuit for developing an output signal when the combined amplitude of the signal and sampling pulses applied thereto is less than said second reference voltage; a logic "And" gate; means for connecting said output circuits of said first and second comparators to said "And" gate to produce an output signal from said "And" gate only in response to simultaneous output signals from both of said comparators; and means connecting the output of said "And" gate to said counter means.

7. Apparatus as claimed in claim 6 further characterized in that said first comparator has a second output circuit for developing an output signal when the combined amplitude of said signal and sampling pulse applied thereto is less than said first reference voltage; further characterized in that said second comparator has a second output circuit for developing an output signal when said combined signal and sampling pulse applied thereto is greater than said second reference voltage; further characterized in that said counter means includes first, second and third counters, in which the output of said "And" gate is connected to said first counter; means connecting the second output circuit of said first comparator to said second counter; means connecting the second output circuit of said second comparator to said third counter; further characterized in that said bistable means includes first, second and third control flip-flops; means connecting the output circuits of said first, second and third counters to said first, second and third control flip-flops, respectively, thereby to set one only of said control flip-flops at any one time and to maintain the other two flip-flops in the reset state; said flip-flops developing prime and inhibit output signals on output leads according to the set or reset state of said flip-flop; first, second and third output "And" gates; means coupling the output signals of said control flip-flops to one or more of said output "And" gates to apply prime or inhibit signals to said "And" gates according to the states of said flip-flops, thereby to prime fully only one output gate at any given time and to maintain the other two output gates in inhibit condition; and means for coupling said position sensing means to said first, second and third output "And" gates to apply inhibit signals to all three gates during the time that the neck portion of a bottle is in the third light beam.

8. Apparatus as claimed in claim 5 characterized in that said comparator means is a single comparator having two output circuits for developing two simultaneous outputs, one high level and the other low levels; further characterized in that said counter means comprises two separate counters; means connecting the high level output circuit of said comparator to one counter and means connecting the low level output circuit of said comparator to the other counter; further characterized in that said bistable means comprises two separate flip-flops each having two output circuits, one developing a prime level signal and the other an inhibit level signal according to the state of the flip-flop; means connecting the output of one counter to one flip-flop and means connecting the output of the other counter to the other flip-flop; further characterized in the provision of three separate output "And" gates; means connecting one output circuit of said one flip-flop to the first and third gates and the other output circuit of said one flip-flop to the second gate; means connecting one output circuit of the other flip-flop to said first gate and the other output circuit of said other flip-flop to said second and third gates; and means connecting the output of the position sensing means to all three gates to inhibit said gates during the time that the neck of a bottle is in said third beam, and to apply prime signals to all three gates when the neck of the bottle is not in said third beam, said connections from said flip-flops to said "And" gates being such that only one output "And" gate is fully primed at any one time.

References Cited by the Examiner

UNITED STATES PATENTS

| | | | |
|---|---|---|---|
| 2,517,554 | 8/1950 | Frommer | 88—14 |
| 2,612,994 | 11/1952 | Woodland et al. | 209—111.6 |
| 2,809,751 | 10/1957 | Hall | 250—223 |
| 2,821,302 | 1/1958 | Fowler et al. | 206—111.6 |
| 2,963,293 | 12/1960 | Klein | 209—111.7 X |
| 3,123,715 | 3/1964 | Husome | 88—14 |
| 3,133,640 | 5/1964 | Calhoun et al. | 88—14 |

JEWELL H. PEDERSEN, *Primary Examiner.*

D. R. STEVENS, F. SHOON, *Assistant Examiners.*